United States Patent [19]
Ottoson

[11] 3,792,330
[45] Feb. 12, 1974

[54] DIRECT CURRENT MOTOR DRIVE

[75] Inventor: Allen E. Ottoson, Westboro, Mass.

[73] Assignee: Vee-Arc Corporation, Westboro, Mass.

[22] Filed: Sept. 14, 1972

[21] Appl. No.: 288,900

[52] U.S. Cl. .................. 318/269, 318/345, 318/375
[51] Int. Cl. .............................................. H02p 5/16
[58] Field of Search .................... 318/269, 326–328, 318/302, 331, 345, 369, 375

[56] References Cited
UNITED STATES PATENTS

| | | | |
|---|---|---|---|
| 3,369,167 | 2/1968 | Hanchett | 318/331 |
| 3,229,182 | 1/1966 | Kubler | 318/331 |
| 3,577,055 | 5/1971 | Hermansson | 318/302 |
| 3,286,151 | 11/1966 | Dinger | 318/331 |
| 3,422,332 | 1/1969 | Dinger | 318/331 |
| 3,514,682 | 2/1967 | Corey | 318/369 |
| 3,603,857 | 9/1971 | Crane | 318/302 |

*Primary Examiner*—Bernard A. Gilheany
*Assistant Examiner*—Thomas Langer
*Attorney, Agent, or Firm*—Kenway & Jenney

[57] ABSTRACT

A system in which a DC motor maintains a constant preset speed under changes of load, the preset speed being variable at will. The system includes a constant-current supply, with diverter means to divert varying amounts of current from the motor circuit depending on the motor speed in comparison with a speed setting.

7 Claims, 11 Drawing Figures

DIRECT CURRENT MOTOR DRIVE

BACKGROUND OF THE INVENTION

DC motors driven from rectified AC sources through thyristors (silicon controlled rectifiers) have presented difficulties in variable-speed operation because of discontinuities in current supply to the motor. A measure of the effect of discontinuities in the armature current is afforded by the "form factor" which is the ratio of rms to average current. A constant direct current has a form factor of unity and it is desirable to approach this low value as closely as possible. Only the average current goes into producing torque, while the heating increases as the square of the form factor.

A high form factor also results in poor commutation. Especially at low speeds discontinuities in torque may result in cogging, which is detrimental to many precision machining operations.

SUMMARY OF THE INVENTION

According to the invention, the source of current for the motor is a constant-current source, preferably obtained from an AC supply through a current-control device. Variable speed operation is attained by a control involving a manually set reference voltage. For any speed setting, constant speed is maintained by diverting variable amounts of current from the motor circuit through thyristors, in which the firing times are controlled by the energy necessary to be supplied to the motor to maintain the speed under the existing load conditions. Continuity of armature current is maintained at all settings and under all load conditions.

A dynamic braking system is provided to dissipate the kinetic energy of the armature and cause rapid deceleration from a high to a lower set speed.

BRIEF DESCRIPTION OF THE DRAWINGS

In the accompanying drawings.

GENERAL DESCRIPTION

Figure 1:
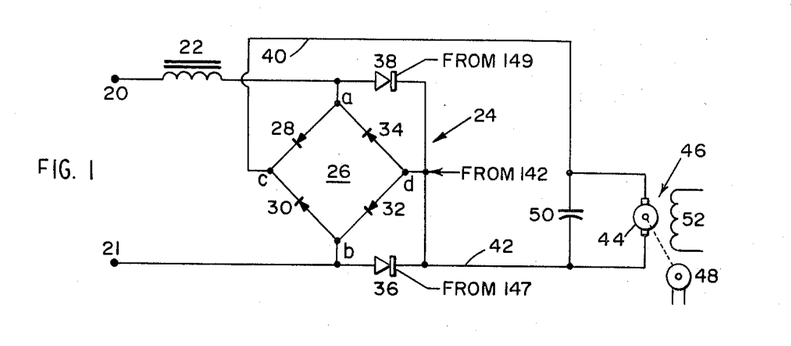
FIG. 1 is a diagram of a part of the preferred embodiment of the invention.

As shown in FIG. 1 the AC supply lines are at 20, 21. One of the lines (20) leads through an inductive reactor or a choke 22 to a combined diverter 24 and rectifier 26, which in turn is connected to the line 21.

The rectifier 26 may be a standard diode bridge comprising, as shown in FIG. 1, four diodes 28, 30, 32 and 34. The diverter comprises two thyristors 36 and 38 preferably of the solid state controlled rectifier type, here shown as silicon controlled rectifiers which will be hereinafter designated as SCR's.

A thyristor has the property that it will start to conduct current only in one direction and then only when the gate is turned ON and will thereafter continue to conduct (even though the gate is turned OFF) until the current cuts off.

The input, as is usual in bridge rectifiers, is connected between diagonally opposed junctions designated $a$ and $b$, namely, at the junction between diodes 28 and 34 and at the junction between diodes 30 and 32, respectively, while the output is taken from the other two diagonal corners $c$ and $d$.

The SCR's 36 and 38 are connected across the diodes 32 and 34 respectively but each is pointed in the direction opposite to its parallel diode. Therefore, when the SCR's are in the conducting mode a direct short-circuit path from $a$ to $b$ is established through SCR 38 and diode 32 in series, and through SCR 36 and diode 34 in series from $b$ to $a$.

The output junctions connect by leads 40 and 42 with the armature 44 of a separately excited DC motor 46.

A capacitor 50 is connected across the output leads 40 and 42 to provide a path for maintenance of armature current during such portions of the cycle as the supply current passes through the diverter SCR's 36 and 38.

The field winding 52 of the motor is separately excited from any suitable source, as for example a battery or by rectified AC from the lines.

The choke 22 operates as a current control device to maintain a constant, or nearly constant, current input to the bridge over wide ranges of load on the motor. The current supplied to the motor armature is then varied by diverting more or less of the source current through the SCR's 36 and 38. The current paths through the bridge-diverter system will now be described.

Assume first that the SCR gates are continuously OFF. The thyristors constitute practically infinite impedances across two arms of the bridge, and the bridge therefore acts as if the thyristors were not present. Thus on a positive half-cycle current passes through the lead 20 and choke 22 to junction $a$ of the bridge, diode 28, lead 40, armature 44, lead 42, diode 32 to junction $b$ and its connection to line 21. On a negative half-cycle a similar circuit is traced from $b$ to $a$ but through diodes 30 and 34 so that only positive current flows through the armature, as in normal rectifier bridge operation.

If the thyristors 36 and 38 are continuously turned on they continuously short circuit the constant current source. On a positive half-wave current flows from junction $a$ through SCR 38 and diode 32 to $b$, while on the negative half-wave current flows from $b$ through SCR 36 and diode 34 to $a$. Thus a continuous short-circuit exists between the input terminals $a$ and $b$ of the bridge, and no current goes to the armature.

By connections to be described presently, the SCR gates may be turned on at intermediate points of the cycle through a phase-control network to vary the amount of current diverted from the constant current source. Thus on a positive half-cycle current will go through the armature by way of diodes 28 and 32 during the first portion of the cycle when the SCR 38 is turned off and will be diverted from the armature for the remainder of the half-cycle after SCR 38 is turned on; in this latter part of the half-cycle short-circuit current runs through SCR 38 and diode 32 in series as above described. When the line current reverses SCR 38 cuts off; then for the first part of the negative half cycle current flows through the armature through diodes 30 and 34, while for the last part of the cycle when SCR 36 is turned on the current is diverted through SCR 36 and diode 34. Therefore by proper phase control the SCR's may be turned on at appropriate times in the successive half cycles to control the supply of current to the armature.

The current control choke 22 performs the function of forming a constant current source to the bridge. The total impedance of the system, as referred to the AC side, is made up of the reactance of which the inductive reactance X of the choke 22 is the major part, and an effective resistance $R_e$ which takes account of the speed and load conditions of the motor as well as the diversion of current through the SCR's. Thus with total diversion $R_e$ is nearly zero, while with less than total diversion, $R_e$ times the current squared represents the motor power plus the losses in the system. The reactance of the choke can be made of a value comparable to or larger than the maximum value of $R_e$, and because of the quadrature relationship between $R_e$ and X, the percentage change of current will be relatively small over the whole range of $R_e$ from zero to its maximum value. Therefore it may be considered that a substantially constant current source exists at the input junction terminals a and b of the bridge-diverter circuitry.

Current Diversion Control

Figure 2:
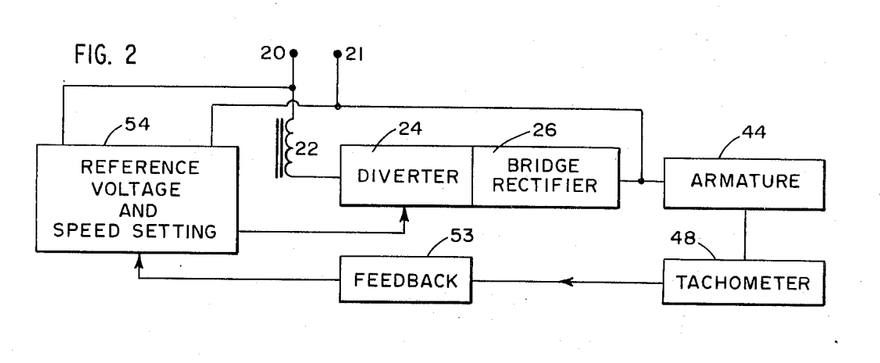
FIG. 2 is a block diagram to illustrate the speed control.

As heretofore noted the amount of current diverted through the diverter circuitry is controlled by timing the gating of the thyristors in their conducting half-cycles, preferably by a phase control of generally well-known type. A block diagram of the control system appears in FIG. 2. The phase control according to the invention is carried out by a feedback loop 53 responsive to a speed setting and to the actual speed of the motor, as indicated by the block 54. The speed setting is a manual setting for desired speed, by which a "reference" voltage is generated, and this reference voltage is compared to a voltage proportional to the motor speed, this speed voltage being conveniently generated by a tachometer 48. (Alternatively the speed voltage may be the counter EMF of the armature measured as the actual terminal voltage of the armature minus a voltage introduced in the circuit to compensate for the IR drop in the armature as will be described later.)

Figure 3:
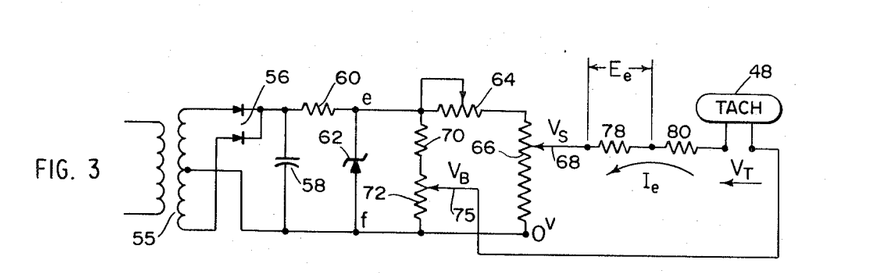
FIG. 3 is a diagram showing the preferred speed control circuitry.

As shown in FIG. 3 the reference voltage is preferably generated from an AC source and a transformer 55 having a center-tapped secondary leading through a full wave rectifier 56 to a filter capacitor 58 and resistor 60. Across the filter is connected a Zener diode 62 for voltage regulation, whereby a substantially constant DC reference voltage appears at the Zener terminals e and f. If desired, there may be substituted for these elements a battery connected between the terminals e and f.

The reference voltage at the terminals e and f may be conveniently about 10 volts. A cOnnection is made from the positive terminal e through a variable resistor 64, to a potentiometer 66 and thence to the negative terminal f. The slider 68 of the potentiometer at voltage $V_s$ above the negative terminal f is a manual setting corresponding to a desired speed of the motor. The variable resistor 64 is a permanently set or "factory" adjustment fo fix the maximum value of $V_s$ corresponding to the maximum desired motor speed.

Also connected across the Zener terminals are a fixed resistor 70 and a potentiometer 72, of which the slider 75 also constitutes a "factory adjustment," whereby the voltage $V_B$ of the slider above the negative terminal can be varied from zero to approximately one-third of the constant reference voltage. The voltage $V_B$ corresponds to the minimum motor speed.

There is a potential difference between the slider 68 and the slider 75, the former being normally at the higher potential. The potential difference between the two sliders is $V_s - V_B$ and this potential is called the reference voltage $V_R$. This reference voltage opposes a voltage proportional to the actual speed of the motor, which voltage may be obtained from a tachometer 48 driven by the motor. (In a modified form of the invention to be described later, the speed voltage may be taken from the armature terminals, with compensation for the voltage drop in the armature resistance.

As shown in FIG. 3 a connection is made from the slider 68 through resistors 78 and 80 and the tachometer terminals to the slider 75. This circuit carries a current designated the error current $I_e$, and the voltage across the resistor 78 is an error voltage $E_e$. This error voltage is $$E_e = (R_{78}/R_{78} + R_{80})(V_T - V_R)$$

where the resistance values of the resistors 78 and 80 are indicated by R with appropriate subscripts, $V_R$ is the reference voltage as above defined and $V_T$ is the tachometer output voltage.

The error voltage $E_e$ is therefore variable over a range dependent on the total speed range. The system parameters are chosen so that the reference voltage $V_R$ is always less than the speed voltage $V_T$ under stable operating conditions, and the error current $I_e$ then flows in the direction indicated by the arrow $I_e$. A certain value of $E_e$ corresponds to the condition of the actual speed being equal to the set speed. If $E_e$ is higher or lower than that value, the diverters are fired at earlier or later times in their half-cycles, to decrease or increase the current supplied to the motor.

Figure 4:
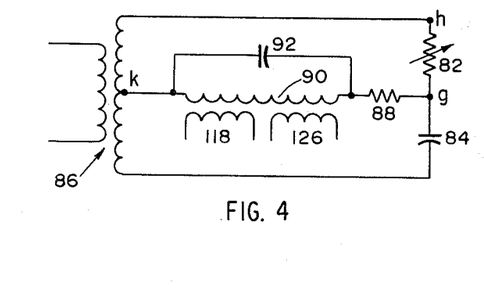
FIG. 4 is a diagram of the phase control for the thyristors.

The manner in which the error voltage is used to control the gates of the SCR's to time the firing thereof is by a phase control circuit, which in general principle is of the usual resistance-capacitance type. In FIG. 4, a variable resistor is shown diagrammatically at 82 with terminals g and h. The resistor and a capacitor 84 are connected in series across the secondary of a transformer 86. Between g at the junction of the resistor-capacitor and a center tap k of the secondary is a circuit comprising a resistor 88 and the primary of a transformer 90, across which is a capacitor 92. The secondaries of the transformer 90 are used to control the transmission of firing pulses to the gates of the SCR's, as will presently appear.

Figure 5:
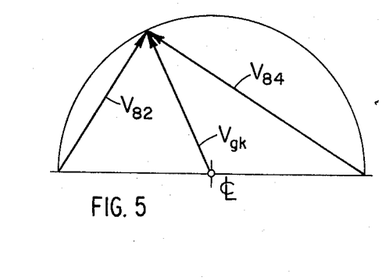
FIG. 5 is a vector diagram for the control circuit of FIG. 4.

The vector diagram for the circuit of FIG. 4 appears in FIG. 5. Since the capacitor and variable resistor carry substantially the same current (the current through the g–k path being limited by the resistor 88), the voltages $V_{82}$ and $V_{84}$ across the resistor and capacitor are in quadrature and the locus of the ends of their vectors is a semicircle, whereby the voltage between g and k is of constant magnitude but of varying phase. As the resistance of the resistor 82 is increased the phase of $V_{gk}$ is retarded.

According to the invention the resistor 82 is varied in accordance with the error voltage. The lower error voltage, the higher will be the resistance, and the more will the phase of $V_{gk}$ be retarded, so that diversion by the SCR's will occur at later instants.

Figure 6:
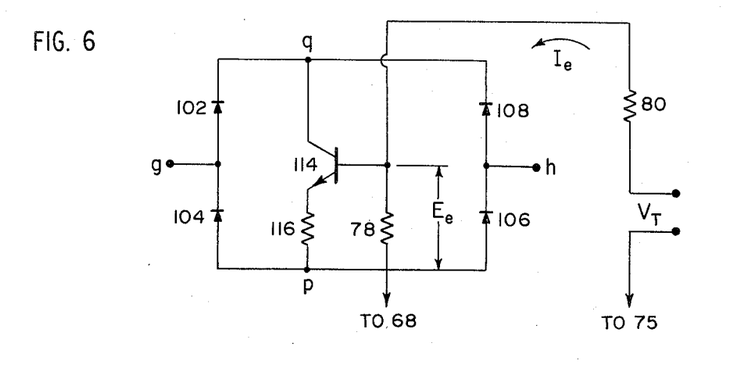
FIG. 6 is a diagram of the preferred means for obtaining variable resistance for phase control.

Although any suitable arrangement for varying the resistor 82 in accordance with the error voltage may be used, the preferred form of the phase-control resistor is obtained by use of a transistor and four diodes connected as shown in FIG. 6. The four diodes designated 102, 104, 106 and 108 are connected as a bridge, the input terminals of which are the terminals $g$ and $h$ of the phase-control resistor. The other junctions of the bridge are $p$ and $q$. The error voltage across the resistor 78 is applied between the junction $p$ and the base of a transistor 114 of which the emitter in series with a resistor 116 is connected to $p$, while the collector is connected to $g$, the transistor-resistor combination being in the "emitter-follower" connection. The junctions $g$ and $h$ of the bridge constitute the similarly designated terminals of the resistor 82 shown in FIG. 4. For comparison with FIG. 3, the resistor 80, the tachometer terminals and the error current $I_e$ are shown in FIG. 6.

By the arrangement of FIG. 6, the base-emitter voltage of the transistor is the error voltage $E_e$. The effective resistance of the circuit between the terminals $g$ and $h$ is therefore governed by the control voltage on the transistor. The higher the error voltage the more transistor current will flow and hence the lower the effective resistance of the path through the transistor will be. The diodes allow a unidirectional current through the transistor with an alternating voltage between the terminals $g$ and $h$. On one half-cycle current flows from $g$ to $h$ through diode 102, transistor 114, resistor 116 and diode 106, and on the next half-cycle, the flow is from $h$ to $g$ through diodes 108 and 104.

Noting that changes in current through the transistor 114 result in changes of effective resistance between the terminals $g$ and $h$, it will be seen from FIG. 4 that these changes result in changes of phase of the voltage across the primary of transformer 90. The phase of the voltage across the primary of transformer 90 may be used in any suitable or well-known manner to control the firing angle of the diverter SCR's. However, for purposes of the present invention, a special phase-control circuit is preferably used, as shown in FIG. 7.

Figure 7:
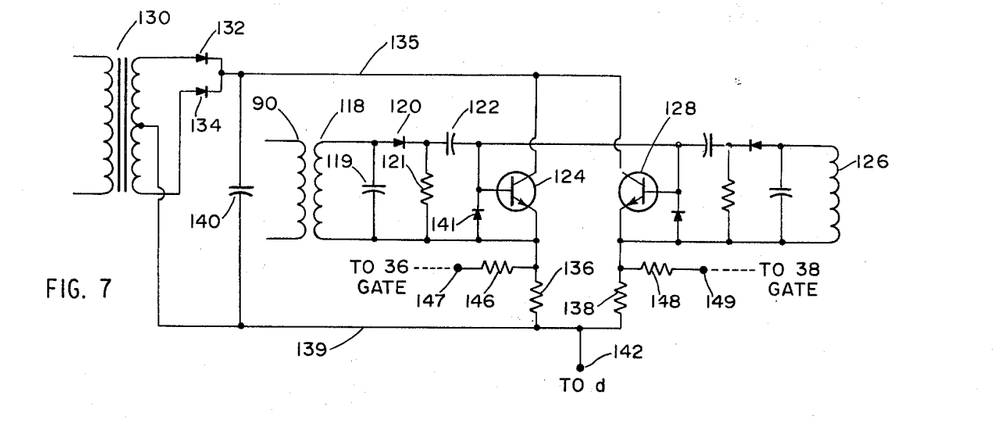
FIG. 7 is a diagram of the circuit for controlling the firing of the thyristors.

The primary 90 of the phase control transformer, previously described in connection with FIG. 4, is shown in FIG. 7. A secondary 118 of transformer 90 with a capacitor 119 across it connects through a diode 120 to a parallel resistor 121 and a series capacitor 122 which applies control voltage to the base of a transistor 124.

A diode 141 is connected between the emitter and base of the transistor 124. At the other side of the figure is shown another secondary 126 of the transformer 90 likewise arranged through a similar circuit to apply a control voltage to the base of a transistor 128. These transistor circuits are powered by a full-wave rectifier circuit including a transformer 130 connected to the line and having a center-tapped secondary leading through diodes 132 and 134 to a lead 135 connected to the collector terminals of the transistors 124 and 128, which transistors are connected through resistors 136 and 138 respectively to the center-tap lead 139. A filter capacitor 140 is connected between the positive lead 135 and the center-tap lead 139. The circuitry associated with the transistor 128 is identical with that for the transistor 124, as shown in FIG. 7, and the detailed description is not repeated.

The center-tap lead 139 has a terminal 142 which is connected to the junction d of the cathodes of the diverter SCR's 36 and 38 of FIG. 1.

In FIG. 7 the junction of the emitter of transistor 124 and the resistor 136 is connected through a resistor 146 to a terminal 147, and the corresponding junction for transistor 128 is connected through a resistor 148 with a terminal 149. The terminals 147 and 149 are connected to the gates of the diverter SCR's 36 and 38 respectively, whereby the voltages of these terminals with respect to the terminal 142 constitute the gate-to-cathode voltages of the respective SCR's. The means by which gating pulses are transmitted at proper times to the diverter SCR's are described as follows:

On a rising part of the sine wave of the voltage of the secondary 118, applied across capacitor 119, the diode 120 conducts and turns the transistor 124 ON. The transistor conducts current in saturation until about the peak of the sine wave, so that the voltage across resistor 136 is a flat-topped pulse about 70° long. As the voltage across the secondary 118 declines from its peak the capacitor 122 discharges through resistor 121 and diode 141, turning off transistor 124 and ending the pulse. The capacitor 122 absorbs the difference between the secondary voltage and the base-emitter voltage of transistor 124. A similar action occurs in the circuit associated with transistor 128.

Figure 8:
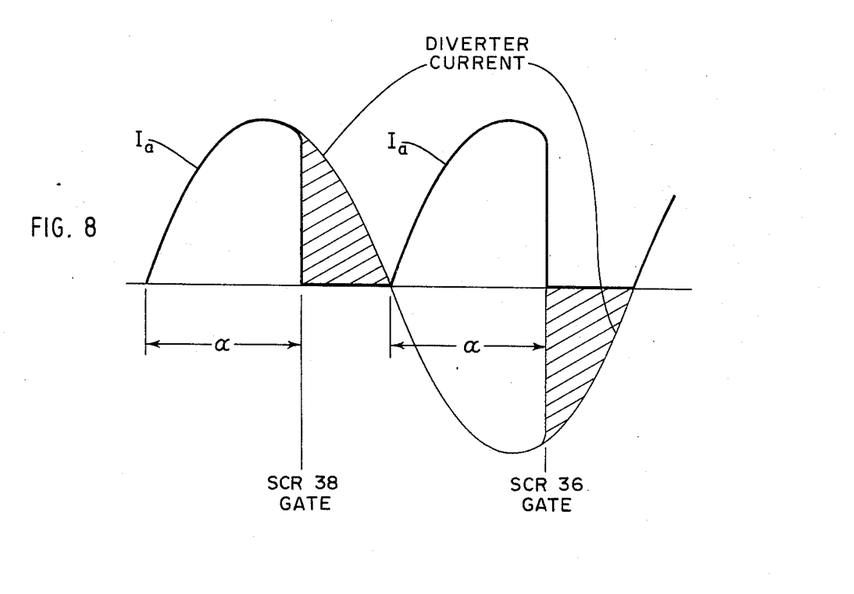
FIG. 8 is a timing diagram.

The timing diagram for the phase control circuit is presented in FIG. 8. The current through the choke 22 is substantially constant as heretofore explained. In the first half-cycle shown in the diagram conduction occurs through diodes 28 and 32 and this conduction constitutes current through the armature in parallel with the capacitor 50, the SCR's being then turned off. At some phase angle $\alpha$ a pulse is applied from the control circuit to the gate of SCR 38 thereby causing short-circuit or diverter current to flow through SCR 38 and diode 32. Current continues through this diverter circuit until the total current passes through zero, at which time the SCR 38 is turned off. In the ensuing negative half-cycle current flows to the armature through diodes 30 and 34 up to the same phase angle $\alpha$ at which time diverter current flows through SCR 36 and diode 34 for the remainder of the negative half-cycle.

As heretofore explained, the error current has a value proportional to the difference between the speed voltage $V_T$ and the reference voltage $V_R$. If the motor has been running under a constant load and at a constant speed, and if the load is then increased, the motor will momentarily slow down, decreasing the speed voltage $V_T$ and therefore decreasing the error current and error voltage. The transistor circuit between $g-h$ of FIG. 6 then acts like a higher resistance; or stated in another way, the resistance of the variable resistor 82 is increased, and hence the phase of $V_{gk}$ is retarded. This causes the diverter SCR's 36 and 38 to fire later in their respective half-cycles, thereby causing less current to be diverted, so that the motor then receives more current and the motor speed is restored.

Similar conditions exist if the speed setting is increased. The increase in reference voltage $V_R$ causes a momentary decrease in error voltage, and the SCR's fire later in their half-cycles, thereby diverting less current, so that the motor current increases to bring the actual motor speed up to the set speed.

Dynamic Braking

If the motor is operating at a high speed and it is desired to change to a lower speed, this is done by setting the control 68 to a lower value, thus decreasing the reference voltage and causing an increase in the error voltage $V_e$. The conditions in going from a high speed to a lower speed are, however, different from the conditions in going from a low to a higher speed. The speed will drop only at a rate determined by the dissipation of the kinetic energy of the armature. In the system thus far described the dissipation of kinetic energy at light loads is largely by friction and windage.

Figure 9:
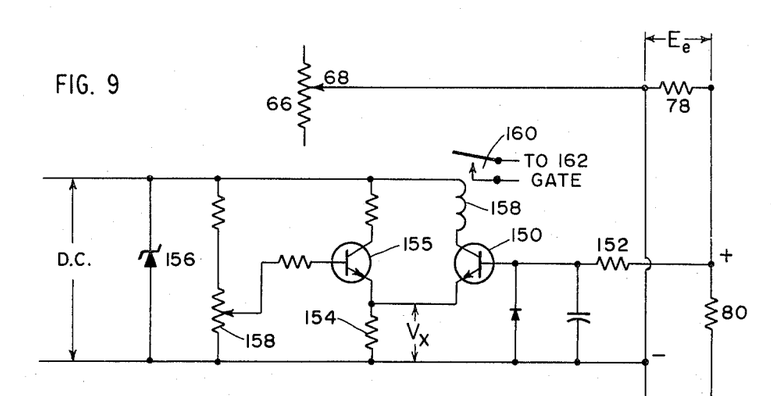
FIGS. 9 and 10 are diagrams of a dynamic braking system.
Figure 10:
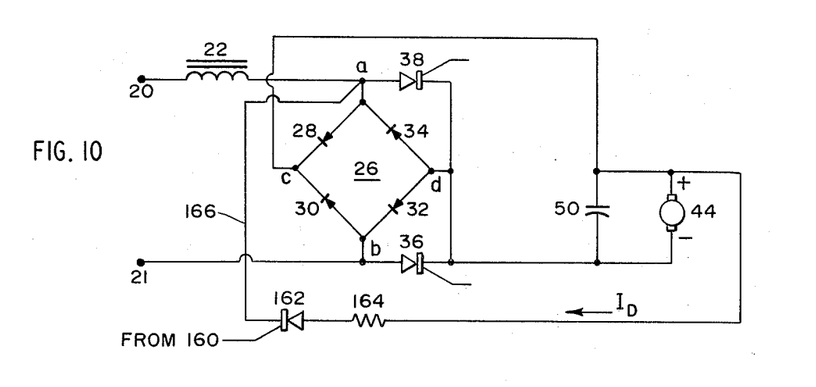

According to the invention provision is made for dissipating energy by dynamic braking in order to cause an acceptably fast deceleration. As shown in FIG. 9, the error voltage $E_e$, which is across resistor 78, is applied to the base of a transistor 150 through a resistor 152. The emitter of the transistor 150 is biased by a voltage $V_X$ appearing across a resistor 154, which carries the emitter current of a transistor 155. The transistors are energized from a constant voltage source, indicated by a Zener diode 156. A potentiometer 158 is connected across the source to set the bias voltage on the transistor 155. The bias voltage $V_X$ is higher than the highest normal level of the error voltage $E_e$, so that the transistor 150 is normally OFF. However, when the reference voltage $V_R$ is suddenly reduced, as it is when the manual control is set for a lower speed, the error voltage $E_e$ becomes large and overcomes the bias voltage $V_X$, so that the transistor 150 is turned on. The current through the transistor energizes a relay 158, which has contacts 160 to close a trigger circuit to the gate of a dynamic braking SCR 162 (FIG. 10). A current $I_D$ then flows in a circuit as follows: from the positive terminal of the armature through a dynamic braking resistor 164, SCR 162, and thence by a lead 166 to the junction $a$ of the bridge rectifier 26. The circuit is completed from point $a$ to the negative armature terminal in a manner to be presently described. Parts of FIG. 1 are repeated in FIG. 10 to show the complete dynamic braking circuit.

Provision is made to cut off the current through the dynamic braking SCR 162 when the error voltage falls to a level low enough to turn off the triggering voltage to its gate, since otherwise the SCR would remain in the conducting mode. At the time the SCR is turned on at the beginning of the dynamic braking period, the error voltage is at a level to independently force the diverter SCR's 36 and 38 to their full ON condition in which they conduct over the full cycle, that is, the angle $\alpha$ is then zero. During the dynamic braking operation the current $I_D$ returns to the negative armature terminal from junction $a$ either through SCR 38 or through diode 34, as follows: If the dynamic braking current is large (i.e., greater than the diverter current), $I_D$ can return through SCR 38 over the full cycle, since the SCR will not turn off at any time in the cycle. On the other hand, when the current $I_D$ is small, the SCR 38 may cut off at some point in the negative half-cycle. However, during such cut-off, conduction of $I_D$ will occur, in effect, through diode 34 to junction $d$ and thence to the negative armature terminal. (Actually at this time diverter current flows from $d$ to $a$ through the diode 34, and the dynamic braking current may be considered as flowing opposite to the diverter current; stated in another way, the total current through 34 is the diverted current from SCR 36 minus the dynamic braking current $I_D$.) When the motor speed declines toward the set speed, the current through the transistor 150 falls to a level at which the relay 158 is deenergized, thereby cutting off the gate voltage of the dynamic braking SCR 162, which nevertheless continues to conduct so long as $I_D$ finds a path to the negative armature terminal either through SCR 38 or diode 34. As the speed continues to diminish toward the set speed, the error voltage continues to fall until it causes the angle $\alpha$ to assume a non-zero value. At the same time, the current $I_D$ has been diminishing because of the slowing-down of the armature, and therefore at some time as the set speed is approached, the SCR 38 becomes momentarily nonconducting during the first part of the positive half-cycle. This momentary break of the path causes the dynamic braking SCR 162 to commutate itself OFF, thus terminating the dynamic braking operation, and allowing stable operation under the new speed and load conditions.

Modified Error Measurement

Instead of using a tachometer for generating a voltage proportional to the speed as in FIG. 3, it is possible to utilize the counter EMF of the armature. The voltage at the armature terminals may be introduced into the error circuit in place of $V_T$. However, the terminal voltage will be higher than the counter EMF by the $I_a R_a$ drop where $I_a$ is the armature current and $R_a$ is the armature resistance.

Figure 11:
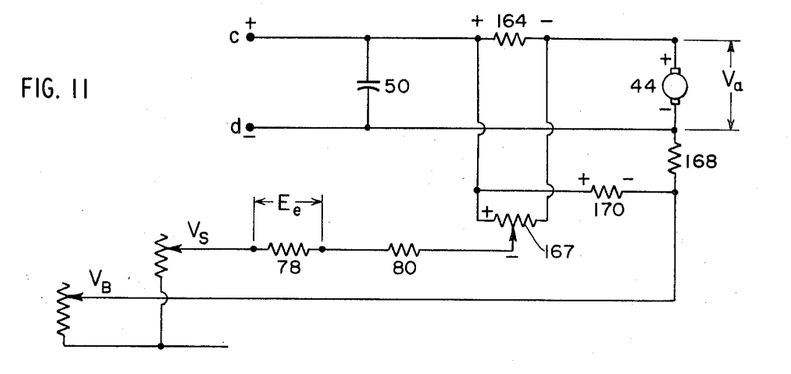
FIG. 11 is a diagram of a modified system.

To compensate for the $I_a R_a$ drop the circuit in FIG. 11 may be used in place of that of FIG. 3. A compensating resistor 164 is in series with the armature. A potentiometer 167 is connected across the resistor 164, and the slider thereof is connected with the resistor 80. The voltage between the slider and the negative end of the compensating resistor is substantially proportional to the IR drop in the resistor 164. Connected across the armature is a resistor 168 in series with a resistor 170, the latter being connected to the positive end of the potentiometer whereby the potential difference across 170 is $R_{170}/R_{168} + R_{170}$ times the terminal voltage $V_{cd}$. The voltage across 164 is small so that $V_{cd}$ approximates the armature terminal voltage $V_a$. By proper selection of the ratio of the resistances and the setting of the potentiometer slider, it is possible to compensate for the voltage drop in the armature resistance, by subtracting the voltage across the positive end and slider of potentiometer 167 from the voltage across $R_{170}$, so that the error voltage $E_e$ across resistor 78 correctly represents the difference between a speed voltage $V_T$ and a reference voltage $V_R$, but with the speed voltage derived from the counter EMF of the motor.

Motor Characteristics

The speed torque characteristics of the motor with no diversion are standard for a separately excited motor, that is, with droop in the speed as the torque is increased. Constant speed operation is obtained with current diversion. For any given speed setting at the voltage divider 66 the diverted current will be such that at any load the armature current will be maintained at a value on one of the speed-torque characteristic curves so that the speed will remain constant.

SUMMARY OF OPERATION

The current flowing into the bridge-diverter circuit is of substantially constant amplitude. Considering the first positive half-cycle, the diverter SCR 38 is turned off at the beginning of the half-cycle and the total rectified current is available for the motor circuit. At a time represented by the phase angle $\alpha$, the SCR 38 is turned on by the transmission of a phased pulse to the gate, and all of the current is diverted for the remainder of the half-cycle. At the end of the positive half-cycle, the SCR 38 turns off by reason of the reversal of current. In the ensuing negative half-cycle the bridge supplies rectified current to the armature circuit during the interval represented by the angle $\alpha$, after which the SCR 36 is turned on and the current is diverted from the armature circuit for the remainder of the half-cycle. Therefore the bridge supplies current to the armature circuit during the angle $\alpha$ of each half-cycle, as indicated by the solid line graph of FIG. 8.

During the $(\pi-\alpha)$ portion of each half-cycle, the bridge does not pass current to the armature, but armature current will continue to flow because of its inductance and the charge in the capacitor 50. By this means continuity of current flow through the armature is established.

The phase angle at which the diverter SCR's fire is determined by a comparison of the actual speed with the speed setting. Under light loads the angle $\alpha$ will be small, and the armature will receive energy from the bridge during only a small portion of each half-cycle. Under heavy loads, the angle $\alpha$ will be large, and energy will be delivered from the bridge to the armature during most or all of each half-cycle.

In any case the firing angle is determined by the error voltage, which is the difference between a voltage proportional to actual speed and the set voltage. The set voltage itself being determined manually for any desired speed.

The speed-torque characteristics are those of a typical self-excited motor. So long as all conditions are constant the motor operates at a constant speed and torque. If the load then increases, the speed will tend to fall, and this results in a lower speed voltage and hence a lower "error" voltage, which causes the diverter SCR's to fire at later times in their half-cycles, so that increased energy is supplied to the motor to maintain its speed under the increase of load. Constant speed operation therefore involves a shift from one speed-torque characteristic to another as the load is varied.

Under conditions in which the load is constant, the error voltage will be constant, and will in all cases be just sufficient to maintain the speed at the set value. When an increase in speed is called for by a new setting of the manual control, the error voltage will decrease, and this will call for firing of the diverter SCR's at later points in their cycles, so that more energy will be supplied to the motor to bring its speed up to the set value.

Therefore whenever there is an increase of load at a given set speed or an increase of the set speed for a given load, the system automatically adjusts itself to increase the energy supplied to the motor. A new equilibrium is established at which the energy supplied to the armature is just sufficient to maintain the desired speed under the existing load conditions. The time required for the establishment of the new conditions will be determined by the time constants of the various components of the system.

A different situation exists, however, when a reduction of supplied energy is called for, as a result of a lowering of the manual set speed. The rotational energy of the armature must then be dissipated, and this dissipation of energy might require an inordinately long time if it depended entirely on the friction and windage losses of the motor. In order to bring the motor quickly to its new characteristic, the dynamic braking feature of the invention is utilized. This operates whenever the error voltage is larger than a certain value. Then the motor is caused to feed energy into the dissipation circuit, wherein the excess energy is quickly dissipated electrically in order to bring the motor into the new equilibrium condition in which the energy supplied is just sufficient to maintain the load at the lower speed.

A feature of the invention is that under all conditions of operation, continuity of armature current is maintained. Therefore, notwithstanding the sharp cut-off of current at the diverter circuit, the problems of poor commutation, cogging and poor regulation frequently encountered in driving DC motors from rectified current are avoided. Stated in another way, the form factor of the armature current is maintained near unity, usually not over about 1.05. The form factor is the ratio of rms to average value. A form factor near unity indicates that no discontinuity in the armature current can exist.

Another feature of the invention lies in the protection afforded by constant current operation. Thus overloading or stalling of the motor, or short-circuiting of any part of the d.c. circuit, cannot result in damage to any part of the system. For the same reason, the SCR's are protected from "shoot-through" at all times, regardless of transient or overload conditions in the system. The system is also protected against damage from external conditions, such as line voltage transients, and the semiconductors are protected from "shoot-through" under all conditions.

I claim:

1. A variable speed motor system comprising an AC source, a DC motor having an armature, a bridge rectifier, an inductor between the source and the rectifier to form a substantially constant current source at the rectifier, connections from the rectifier to the armature, a capacitor across the armature, and diverter means comprising thyristors connected across arms of the bridge to divert current from said constant current source to vary the current passing through the rectifier to be supplied to the armature.

2. A system as defined in claim 1 in which the thyristors are silicon controlled rectifiers having conduction control gates, and means for applying firing potentials to said gates at selected times in successive half-cycles to control the diversion of current from said constant current source.

3. A system as defined in claim 2, having in addition a reference circuit, means for introducing into the reference circuit a manually selected reference voltage, means for introducing into the reference circuit a speed voltage dependent on the motor speed, whereby an error voltage which is the difference between the speed voltage and the reference voltage exists in the reference circuit, and means controlled by the error voltage for controlling the diverter means.

4. A system as defined in claim 2, in which the means for applying firing potentials to the gates comprises a reference circuit, means for introducing into the reference circuit a manually selected reference voltage, means for introducing into the reference circuit a speed voltage dependent on the motor speed, whereby an error voltage which is the difference between the speed voltage and the reference voltage exists in the reference circuit, and means controlled by the error voltage for determining the times at which the firing potentials are applied to the gates in successive half-cycles.

5. A system as defined in claim 2, in which the means for applying firing potentials to the gates comprises a reference circuit, means for introducing into the reference circuit a manually selected reference voltage, means for introducing into the reference circuit a speed voltage dependent on the motor speed, whereby an error voltage which is the difference between the speed voltage and the reference voltage exists in the reference circuit, a phase control circuit including a variable resistance for determining the times at which the firing potentials are applied to the gates, and means for controlling the variable resistance in dependence on the error voltage.

6. A system as defined in claim 3 in which the speed voltage is taken from the armature voltage of the motor, and means are provided for compensating for the IR drop in the armature.

7. A system as defined in claim 6, having in addition a dynamic braking circuit, and means for connecting the dynamic braking circuit across the armature when the error voltage is of a value to call for a reduction of motor speed, whereby kinetic energy of the armature is dissipated in the dynamic braking circuit, said dynamic braking circuit including a dynamic braking thyristor, means controlled by the error voltage for firing the dynamic braking thyristor, and means for commutating the dynamic braking thyristor off when the error voltage is in the range of stable operation, the commutating means including a connection between the dynamic braking circuit and the diverter means to cut off the current through the dynamic braking thyristor when the diverter means becomes non-conducting.

* * * * *

PO-1050
(5/69)

UNITED STATES PATENT OFFICE
CERTIFICATE OF CORRECTION

Patent No. 3,792,330      Dated February 12, 1974

Inventor(s) Allen E. Ottoson

It is certified that error appears in the above-identified patent and that said Letters Patent are hereby corrected as shown below:

Column 5, line 18, cancel "g" and substitute --q--.

Column 12, line 7, cancel "6" and substitute --3--.

Signed and sealed this 13th day of August 1974.

(SEAL)
Attest:

McCOY M. GIBSON, JR.      C. MARSHALL DANN
Attesting Officer      Commissioner of Patents